US012721773B2

(12) United States Patent
Sekulic

(10) Patent No.: US 12,721,773 B2
(45) Date of Patent: Sep. 1, 2026

(54) INTERMETATARSAL SPACE VIBRATOR

(71) Applicant: Selina Sekulic, Salt Lake City, UT (US)

(72) Inventor: Selina Sekulic, Salt Lake City, UT (US)

(*) Notice: Subject to any disclaimer, the term of this patent is extended or adjusted under 35 U.S.C. 154(b) by 605 days.

(21) Appl. No.: 18/199,620

(22) Filed: May 19, 2023

(65) Prior Publication Data

US 2024/0382365 A1 Nov. 21, 2024

(51) Int. Cl.
*A61H 1/02* (2006.01)
*A61H 23/02* (2006.01)

(52) U.S. Cl.
CPC ........... *A61H 1/0266* (2013.01); *A61H 23/02* (2013.01); *A61H 2001/027* (2013.01); *A61H 2201/0221* (2013.01); *A61H 2201/5097* (2013.01)

(58) Field of Classification Search
CPC ............ A61H 1/0266; A61H 2001/027; A61H 23/00; A61H 23/02; A61H 23/0245–0263; A61H 2023/0272–029; A61H 2201/02–0235; A61H 2201/164–1642; A61H 2201/5097; A61H 2205/12–125
See application file for complete search history.

(56) References Cited

U.S. PATENT DOCUMENTS 5,076,263 A 12/1991 Funatogawa
5,713,832 A * 2/1998 Jain .................... A61H 23/0263 601/60
5,836,899 A * 11/1998 Reilly ...................... A43B 3/34 36/141
6,213,963 B1 4/2001 Smith
6,238,357 B1 5/2001 Kawaguchi et al.
6,258,048 B1 * 7/2001 Montague .............. A61H 7/001 601/19
7,264,599 B1 * 9/2007 Milligan .................. A43B 5/08 36/141

(Continued)

FOREIGN PATENT DOCUMENTS

CN 201551568 U 8/2010
CN 201578526 U 9/2010

(Continued)

*Primary Examiner* — Rachel T Sippel
(74) *Attorney, Agent, or Firm* — LYON & HARE, LLP; Richard T. Lyon

(57) ABSTRACT

An intermetatarsal space vibrator for vibrating the regions of the bottom of an individual's forefoot underlying the intermetatarsal spaces includes a flexible sleeve that fits over the end of the individual's foot. The sleeve's bottom portion has an interior facing side which contacts the transverse arch area of the bottom of the individual's forefoot, and a top portion that contacts the top of the individual's foot opposite the bottom portion of the sleeve. The intermetatarsal space vibrator also includes vibration units, each of which is embedded in the bottom portion of the flexible sleeve in a location that is under a different one of the intermetatarsal spaces. The vibration units produce vibrations that stimulate the intermetatarsal nerve and other tissues disposed within the associated intermetatarsal space. The intermetatarsal space vibrator can also include a heating and cooling element that heats or cools the transverse arch area of the individual's foot.

21 Claims, 8 Drawing Sheets

(56) References Cited

U.S. PATENT DOCUMENTS

| | | | | |
|---|---|---|---|---|
| 7,614,168 | B1 * | 11/2009 | Zummer | A61H 15/0078 601/126 |
| 8,002,675 | B2 | 8/2011 | Ferri | |
| 8,322,055 | B1 * | 12/2012 | Saint-Cyr | A43B 3/34 36/141 |
| 11,129,768 | B1 * | 9/2021 | Gresham | A61H 15/0078 |
| 2005/0229430 | A1 * | 10/2005 | Takaba | A43B 3/102 36/94 |
| 2011/0232134 | A1 * | 9/2011 | Radl | A61F 5/14 36/141 |
| 2012/0023785 | A1 * | 2/2012 | Barnes | A43B 7/142 36/141 |
| 2014/0200492 | A1 * | 7/2014 | Ahlstrom | A61F 5/14 601/46 |
| 2018/0213879 | A1 * | 8/2018 | Campbell | A43B 3/36 |
| 2020/0061378 | A1 * | 2/2020 | Ganguly | A61B 5/305 |
| 2020/0253320 | A1 * | 8/2020 | Guard | A63F 13/245 |
| 2023/0030080 | A1 * | 2/2023 | Braisz | A61B 5/1113 |
| 2023/0048713 | A1 * | 2/2023 | Gibson | A61H 7/004 |

FOREIGN PATENT DOCUMENTS

| | | | |
|---|---|---|---|
| CN | 209474899 | U | 10/2019 |
| CN | 214761643 | U | 11/2021 |
| JP | 3973640 | B2 | 9/2007 |
| JP | 2017042575 | A | 3/2017 |
| KR | 200455188 | Y1 | 8/2011 |

* cited by examiner

INTERMETATARSAL SPACE VIBRATOR

BACKGROUND

The intermetatarsal spaces are located in the forefoot of an individual between two adjacent metatarsal bone heads, below and above the deep transverse metatarsal ligament (DTML) that separates the spaces into two levels. These intermetatarsal spaces include muscle tissue, blood vessels, nerves, and other tissues. It is not uncommon for the tissues in the intermetatarsal space to become inflamed due to injury, thereby causing the individual to experience pain, numbness and tingling in the area.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

In one implementation, an intermetatarsal space vibrator for vibrating the regions of the bottom of an individual's forefoot underlying the intermetatarsal spaces, includes a flexible sleeve that fits over the end of the individual's foot. The flexible sleeve includes a bottom portion having an interior facing side which contacts the transverse arch area of the bottom of the individual's forefoot, and a top portion that contacts the top of the individual's foot behind the toes and opposite the bottom portion of the sleeve. The intermetatarsal space vibrator also includes at least one vibration unit. Each vibration unit is embedded in the bottom portion of the flexible sleeve in a location that is under a different one of the intermetatarsal spaces of the individual's forefoot whenever the flexible sleeve is installed onto the individual's foot. Each vibration unit produces vibrations that stimulate the intermetatarsal nerve and other tissues disposed within the associated intermetatarsal space. Further, the intermetatarsal space vibrator includes a control and power circuit embedded in the top portion of the flexible sleeve which is electrically connected to each of the vibration units, and which is employed to activate and deactivate each vibration unit and to increase and decrease the intensity of the vibrations produced by each vibration unit.

In another implementation, the intermetatarsal space vibrator includes the flexible sleeve and at least one vibration unit, as described previously. However, in this implementation, the control and power circuit is employed to activate and deactivate each vibration unit separately and to separately increase and decrease the intensity of the vibrations produced by each vibration unit.

In yet another implementation, the intermetatarsal space vibrator includes the flexible sleeve and at least one vibration unit, as described before. However, this implementation of the intermetatarsal space vibrator also includes a heating and cooling element disposed between the exterior-facing surface of the bottom of the flexible sleeve and the embedded vibration units that when activated either heats or cools the entire transverse arch area of the individual's foot. In addition, the control and power circuit embedded in the top portion of the flexible sleeve of this implementation is electrically connected to each of the vibration units and to the heating and cooling element. The control and power circuit is employed to activate and deactivate each vibration unit and to increase and decrease the intensity of the vibrations produced by each vibration unit, and to activate and deactivate the heating and cooling element and select whether the heating and cooling element heats or cools the individual's foot.

DESCRIPTION OF THE DRAWINGS

The specific features, aspects, and advantages of the intermetatarsal space vibrator implementations described herein will become better understood with regard to the following description, appended claims, and accompanying drawings where:

FIG. 4A depicts the bottom portion of the flexible sleeve of the intermetatarsal space vibrator, and FIG. 4B depicts a cross-sectional view of the flexible sleeve of the intermetatarsal space vibrator taken along line A-A of FIG. 4A.

DETAILED DESCRIPTION

Figure 1:
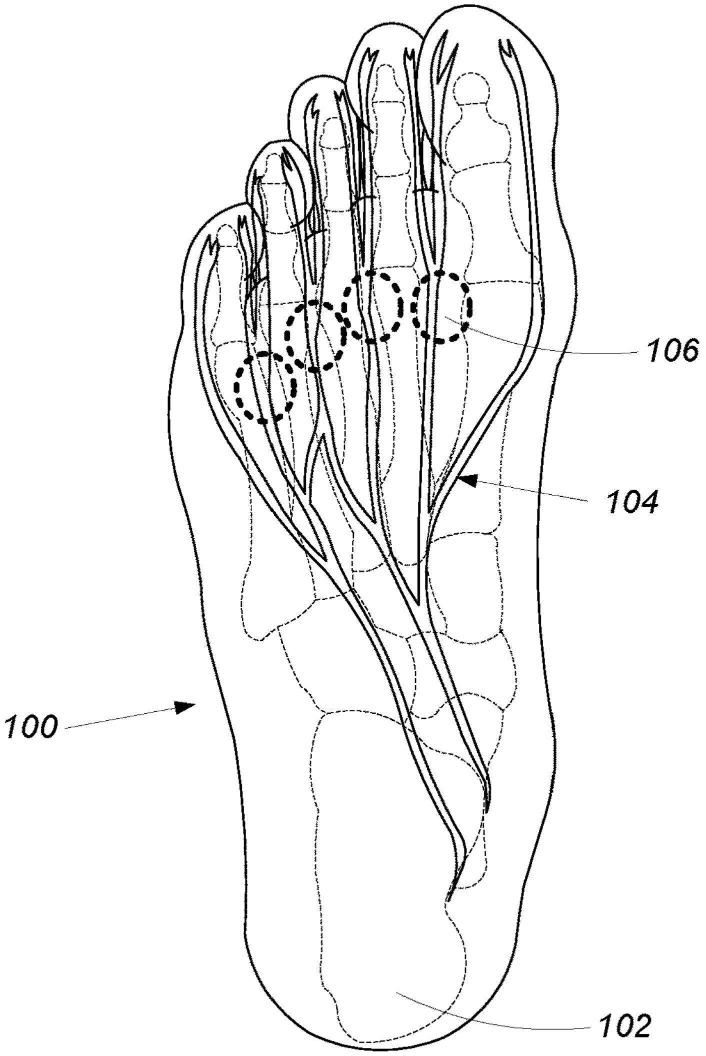
FIG. 1 is a diagram illustrating the bottom of an individual's foot with the underlying bones shown in dashed lines and the approximate locations of the internal intermetatarsal nerves shown using wide-width lines. In addition, the location of the intermetatarsal spaces are indicated by dotted line circles.

In the following description reference is made to the accompanying drawings which form a part hereof, and in which are shown, by way of illustration, specific implementations in which an intermetatarsal space vibrator can be practiced. It is understood that other implementations can be utilized, and structural changes can be made without departing from the scope of the intermetatarsal space vibrator.

It is also noted that for the sake of clarity specific terminology will be resorted to in describing the intermetatarsal space vibrator implementations and it is not intended for these implementations to be limited to the specific terms so chosen. Furthermore, it is to be understood that each specific term includes all its technical equivalents that operate in a broadly similar manner to achieve a similar purpose. Reference herein to “one implementation”, or “another implementation”, or an “exemplary implementation”, or an “alternate implementation”, or “some implementations”, or “one tested implementation”; or “one version”, or “another version”, or an “exemplary version”, or an “alternate version”, or “some versions”, or “one tested version”; or “one variant”, or “another variant”, or an “exemplary variant”, or an “alternate variant”, or “some variants”, or “one tested variant”; means that a particular feature, a particular structure, or particular characteristics described in connection with the implementation/version/variant can be included in one or more implementations of the hand-held controller. The appearances of the phrases “in one implementation”, “in another implementation”, “in an exemplary implementation”, “in an alternate implementation”, “in some implementations”, “in one tested implementation”; “in one version”, “in another version”, “in an exemplary version”, “in an alternate version”, “in some versions”, “in one tested version”; “in one variant”, “in another variant”, “in an exemplary variant”, “in an alternate variant”, “in some variants” and “in one tested variant”; in various places in the specification are not necessarily all referring to the same implementation/version/variant, nor are separate or alternative implementations/versions/variants mutually exclusive of other implementations/versions/variants. Yet furthermore, the order of process flow representing one or more implementations, or versions, or variants does not inherently indicate any particular order nor imply any limitations of the intermetatarsal space vibrator.

As utilized herein, the terms “component,” “system,” “controller” and the like can refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. One or more components can reside within a process and a component can be localized on one computing device and/or distributed between two or more computing devices. The term “processor” is generally understood to refer to a hardware component, such as a processing unit of an electronic circuit.

Also as utilized herein, an electronic circuit is composed of individual electronic components, such as resistors, transistors, capacitors, inductors diodes, processors, memory, and so on, connected by conductive wires or traces through which electric current can flow.

Furthermore, to the extent that the terms “includes,” “including,” “has,” “contains,” and variants thereof, and other similar words are used in either this detailed description or the claims, these terms are intended to be inclusive, in a manner similar to the term “comprising”, as an open transition word without precluding any additional or other elements.

1.0 Intermetatarsal Space Vibrator

FIG. 1 depicts the bottom of an individual’s foot 100 with the underlying bones 102 shown in dashed lines and the approximate locations of the internal intermetatarsal nerves 104 shown using wide-width lines. The approximate locations of the intermetatarsal spaces 106 are indicated in FIG. 1 by the dotted-line circles. Intermetatarsal space vibrator implementations described herein have several advantages. Generally, the intermetatarsal space vibrator focuses vibration in the intermetatarsal space of the foot where a portion of one of the intermetatarsal nerves traverses prior to bifurcating and extending into the toes. In addition, there are portions of ligaments that traverse the intermetatarsal spaces, as well as muscle tissue, blood vessels and other tissues. Applying vibration to the intermetatarsal spaces and so to the nerves, ligaments, and other tissues within the spaces is believed to be beneficial to an individual. For example, the vibrations stimulate the muscle fibers, ligaments, and nerves, which is believed to increase blood circulation in these tissues. This in turn helps reduce pain, numbness, tingling and inflammation in the area, as well as promote healing, relax stiffness, and improve flexibility. It is also believed that stimulating the nerves in intermetatarsal spaces imparts a sense of pleasure in some individuals.

Figure 2:
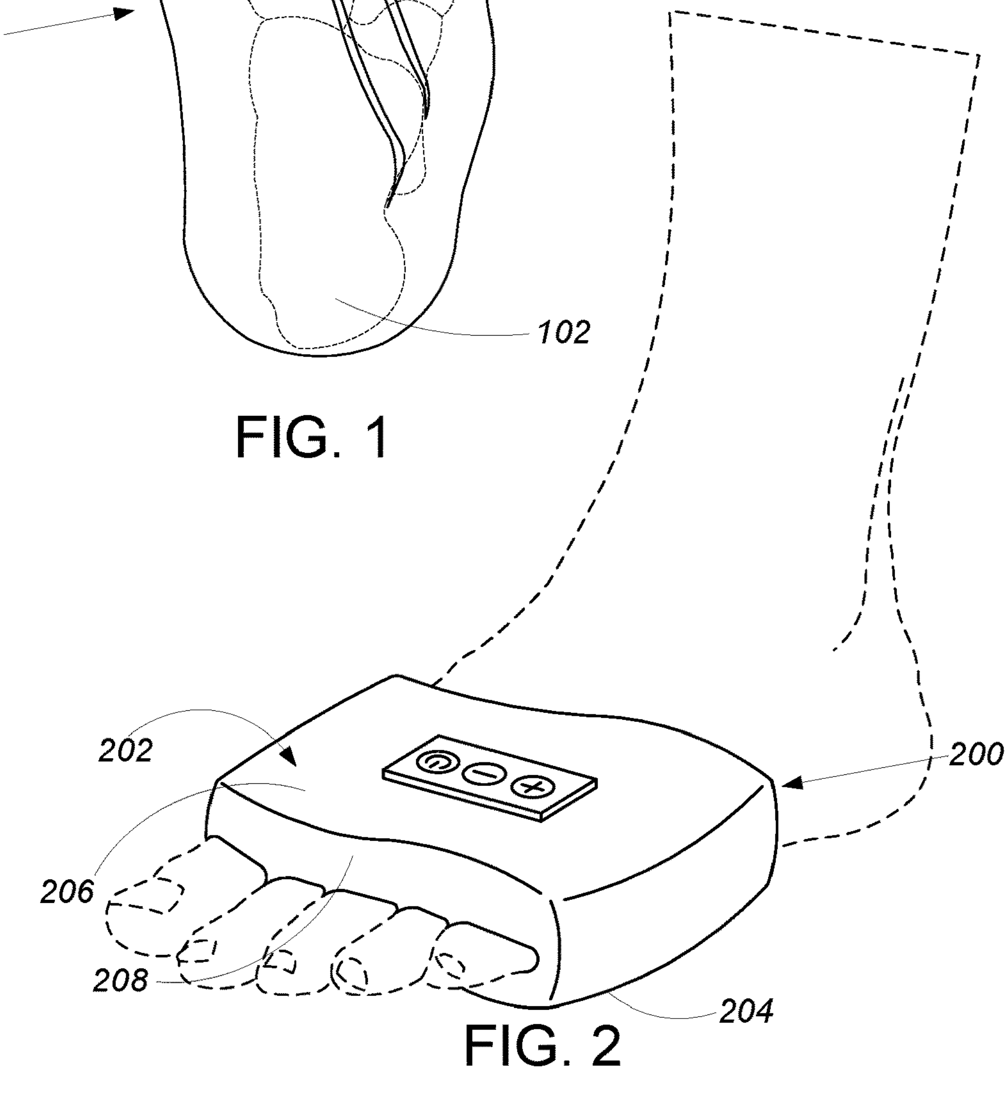
FIG. 2 is a diagram illustrating a perspective view of an exemplary implementation of the intermetatarsal space vibrator.

Referring to FIG. 2, in one implementation, the intermetatarsal space vibrator 200 includes a flexible sleeve 202 that fits snuggly but comfortably over the end of an individual’s foot (i.e., the individual’s forefoot). In one version, the flexible sleeve 202 is constructed from a medical grade silicon material and can be manufactured via any suitable method such as injection molding, 3D printing, and so on. A bottom portion 204 of flexible sleeve has an interior facing side that contacts the transverse arch area of the bottom of the individual’s forefoot, and a top portion 206 of the sleeve that has an interior facing side which contacts the top of the individual’s foot behind the toes and opposite the bottom portion of the sleeve. In the depicted implementation, there are openings in the front portion 208 of the sleeve that allow the individual’s toes to extend out of and forward of the sleeve. However, while having a separate opening for each toe is advantageous in that it aids in securing the flexible sleeve to the end of an individual’s foot, alternate implementations of the intermetatarsal space vibrator can have a flexible sleeve that is completely open in the front.

The flexible sleeve implementation depicted in FIG. 2 is designed to be installed on an individual’s left foot. A flexible sleeve designed to be installed on an individual’s right foot is the mirror image of the sleeve depicted in FIG. 2. In general, variations in the shape and size of the feet of different individuals that could benefit from using the intermetatarsal space vibrator make it advantageous to offer the flexible sleeve in different sizes and varying the shape so that the sleeve is left or right foot specific. For example, the toe openings are made larger for an individual’s larger toes and smaller for the individual’s smaller toes. As such, the flexible sleeve used on an individual’s left foot is different from the sleeve used on the individual’s right foot.

1.1 Vibration Units

Figure 3:
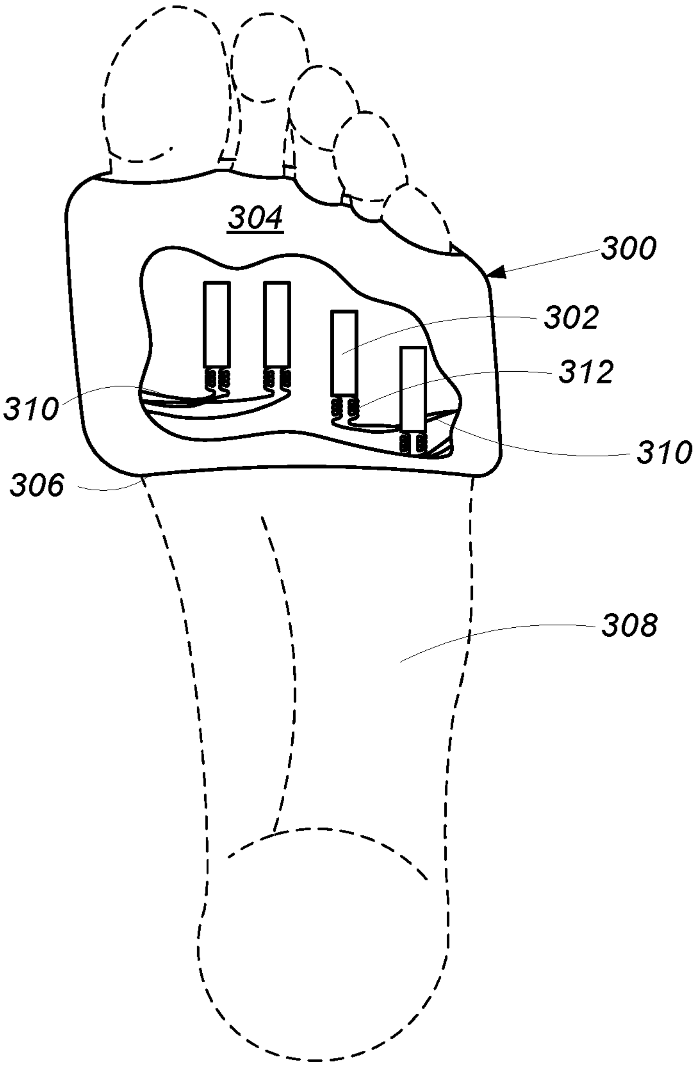
FIG. 3 is a diagram illustrating an exemplary implementation of the bottom portion of the flexible sleeve of the intermetatarsal space vibrator with four embedded vibration units and their associated wiring visible.

Referring now to FIG. 3, the intermetatarsal space vibrator 300 also has at least one vibration unit 302 (but up to four units as shown in FIG. 3) embedded into the bottom portion 304 of the sleeve. Each vibration unit 302 is located to underlie a different intermetatarsal space of the individual’s forefoot when the flexible sleeve 306 is installed on the individual’s foot 308. Each of the vibration units 302 produces vibrations when activated. These vibrations stimulate the intermetatarsal nerve and other tissues disposed within the associated intermetatarsal space. In one version, each vibration unit 302 takes the form of an encapsulated, electric vibration motor which vibrates when electric current is applied to the unit. The electric vibration motor is not described in detail herein as it is a known device and commercially available. For example, an electric vibration motor such as the encapsulated vibration motors manufactured by Need For Power (NFP) Electronics Co. of Longhua, Shenzhen, China can be used. These cylindrical motors have a diameter of about 7 mm and a length of about 20-24 mm. However, it is not intended to limit the intermetatarsal space vibrator implementations to just these motors. Any appropriately sized, commercially available encapsulated vibration motor can be used instead.

As each vibration unit is embedded into the bottom of the flexible sleeve, when a vibration unit is vibrating, the vibrations are transmitted to the flexible sleeve material surrounding the vibration unit. The vibrations of the flexible sleeve material surrounding the vibration unit are then transferred to the intermetatarsal space of the individual's foot that overlies the vibration unit.

It is noted that the distances between intermetatarsal spaces on an individual's foot can vary. The spacing of the vibration units shown in the implementation of FIG. 3 is just one example. In alternate implementations, the spacing can be customized to the individual's foot or spaced to match the average separation distance between intermetatarsal spaces found on people's feet.

1.2 Heating and Cooling Element

Figure 4A:
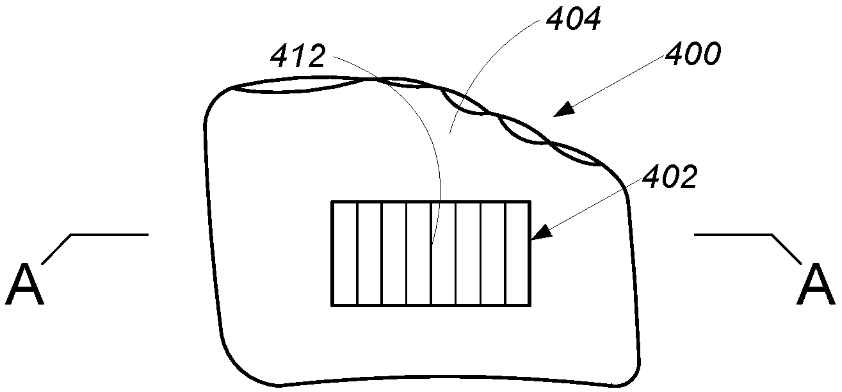
FIGS. 4A-B are diagrams illustrating two views of an exemplary implementation of the intermetatarsal space vibrator that includes an embedded heating and cooling element.
Figure 4B:
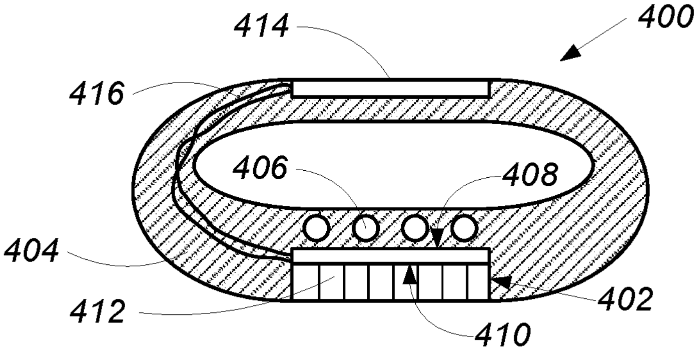

Referring to FIGS. 4A and 4B, in one implementation, the intermetatarsal space vibrator 400 also includes a heating and cooling element 402 that is at least partially embedded in the bottom portion 404 of the flexible sleeve and located under the vibration units 406 on the exterior-facing side of the bottom of the flexible sleeve. The heating and cooling element 402 is oriented longitudinally along the flexible sleeve (i.e., laterally in relation to an individual's foot when the flexible sleeve is installed on the foot) and long enough to heat or cool most of the transverse arch area of the individual's foot. When activated, the heating and cooling element 402 either heats the area of the individual's foot adjacent to the element or cools the area of the individual's foot adjacent to the element.

Application of heat or cold to the bottom of an individual's forefoot has several advantages. For example, heat therapy is thought to be beneficial in treating chronic injuries characterized by soreness, tension, and dull pain by improving blood circulation. Heat therapy also relaxes muscle fibers, increase mobility, and encourages healing. Cold therapy, on the other hand, is useful in treating acute injuries as the cold constricts blood vessels and reduces swelling. Cold is also believed to numb the nerves in the area and so reduce pain.

In one implementation, the heating and cooling element 402 takes the form of a thermoelectric heating and cooling device. The thermoelectric heating and cooling device will not be described in detail herein as it is a known device and commercially available. However, in general, this type of device typically has two electrical leads and is powered by an electric current. The direction of the current flow determines whether the exterior-facing surface 408 of the device heats or cools the surrounding media, which in this case is generally the part of the bottom portion of the flexible sleeve that is adjacent to the individual's foot. In addition, the intensity of the current determines the temperature that the surrounding media is heated or cooled to within the temperature range capability of the device. It also noted that the thermoelectric heating and cooling device has an interior-facing surface 410 that cools when the exterior-facing side 408 heats, and heats when the exterior-facing side 408 cools. As such, the interior-facing side 410 is attached to a radiator structure 412 that brings heat in when the interior-facing side is cooling and draws heat out when the interior-facing side is heating.

1.3 Control and Power Circuit

Figure 5:
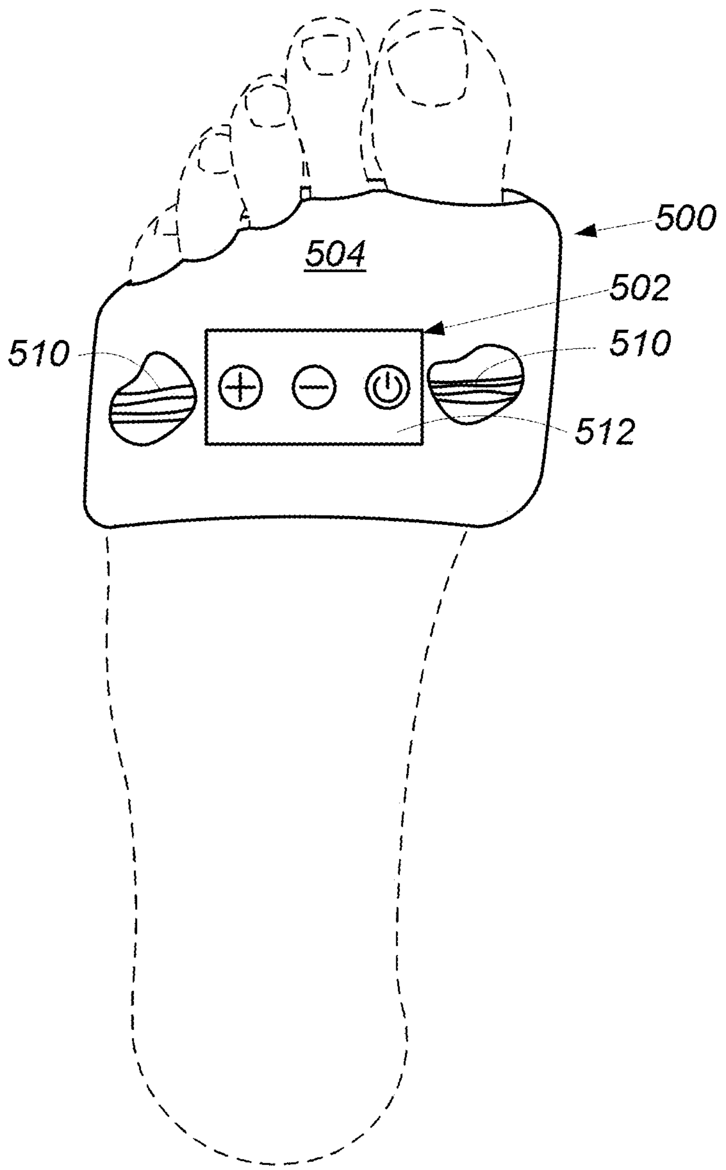
FIG. 5 is a diagram illustrating an exemplary implementation of the top portion of the flexible sleeve of the intermetatarsal space vibrator with control actuators, a part of the control and power circuit, and the associated wiring visible.

Referring to FIG. 5, implementations of the intermetatarsal space vibrator 500 described herein further include a control and power circuit 502 that is embedded in the top portion 504 of the flexible sleeve and electrically connected to each of the vibration units. The control and power circuit 502 activates and deactivates the vibration units, as well as increases and decreases the intensity of the vibrations produced by the units.

The electrical connection between the control and power circuit and the vibrations units can take several forms. In one implementation shown in FIGS. 3 and 5, each of the vibration units 302 is directly connected to the control and power circuit 502 via a pair of electrical conductors 310/510 (e.g., insulated stranded copper wires) that are embedded into the flexible sleeve and run either around the left side, or right side, or both sides of the sleeve (as shown). In another implementation, the current input leads of each of the vibration units are connected to a first electrical conductor and the current output leads of each vibration unit are connected to a second electrical conductor. The first and second electrical conductors are embedded into the flexible sleeve and run either around the left side or right side of the sleeve to the control and power circuit. In yet another implementation, the current input lead and current output lead of each vibration unit are connected to a circuit board that is also embedded in the bottom portion of the flexible sleeve. An embedded electric cable is attached to the circuit board and runs either around the left side or right side of the sleeve to the control and power circuit. The circuit board can electrically tie all the input current leads of the vibrations units together and tie all the output current leads of the vibration units together. In this version, the electric cable would include a first electrical conductor associated with the combined input current leads of the vibration units and a second electrical conductor associated with the combined output current leads of the vibration units. Alternatively, the electric cable could include different electrical conductors for each of the input current leads of the vibration units and different electrical conductors for each of the output current leads of the vibration units. In any of the foregoing implementations, the current leads of the vibration units can be connected to an electrical conductor or a circuit board via a strain-relieved conductor such a coiled wire (312 in FIG. 3). This is advantageous in that it makes the electrical connections to the vibration units more resilient despite the movement induced when the vibration units are vibrating.

If a heating and cooling element is included in the intermetatarsal space vibrator, it is electrically connected to the control and power circuit via electrical conductors in any of the foregoing ways described for the vibration units. For example, in one implementation shown in FIGS. 4A and 4B, the heating and cooling element 402 is directly connected to the control and power circuit 414 via a pair of electrical conductors 416 (e.g., insulated stranded copper wires) that are embedded into the flexible sleeve and run either around the right side or left side (as shown) of the sleeve. The control and power circuit 502 activates and deactivates the heating and cooling element as well as increases and decreases the temperature produced in the flexible sleeve by the element.

Figure 6:
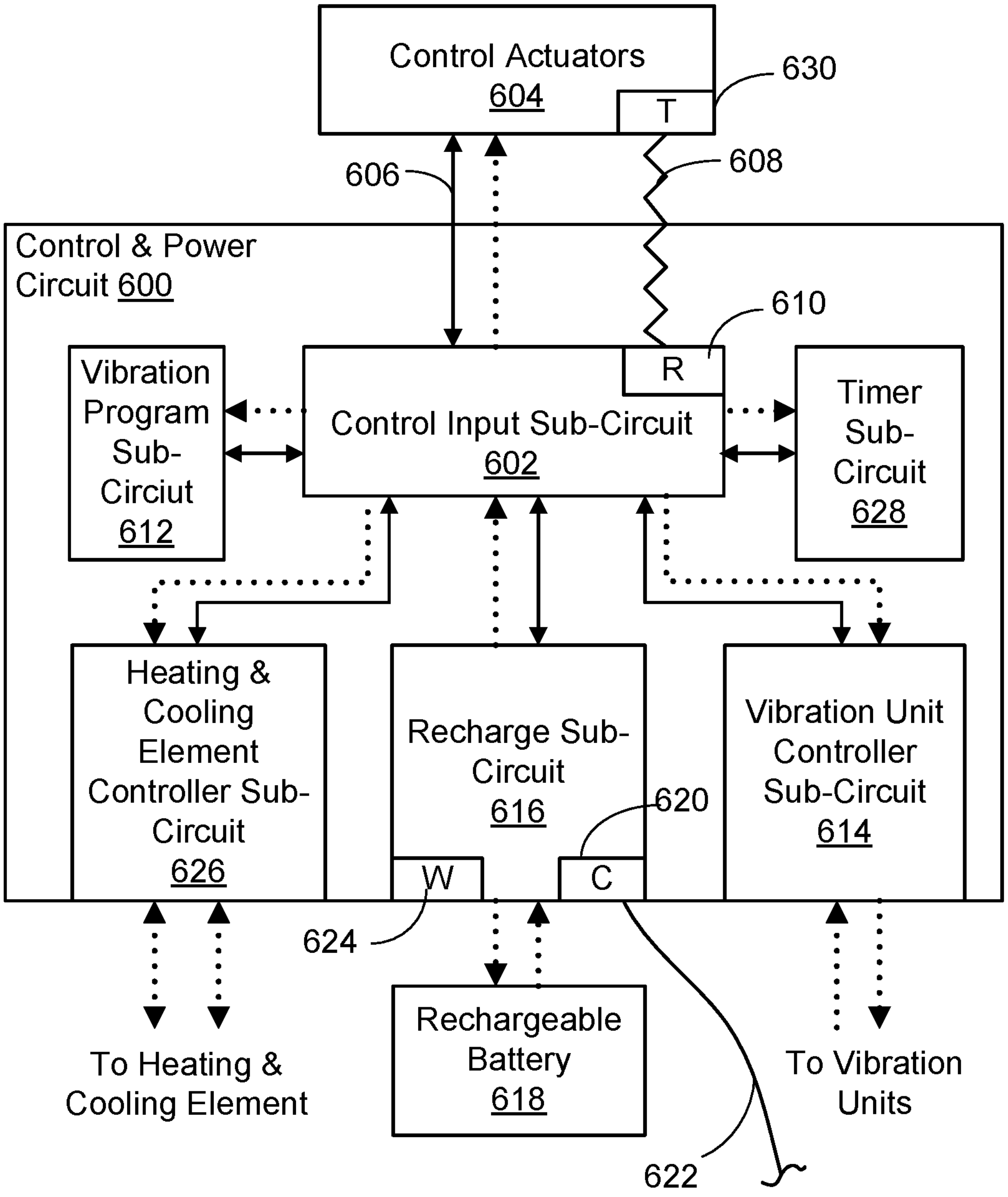
FIG. 6 is a schematic block diagram illustrating an exemplary implementation of the control and power circuit of the intermetatarsal space vibrator.

In general, the control and power circuit controls the vibration units based on inputs from a user. In addition, the control and power circuit controls the heating and cooling element based on inputs from a user, if the heating and cooling element is included in the intermetatarsal space vibrator. More particularly, in one implementation illustrated in FIG. 6, the control and power circuit 600 includes a control input sub-circuit 602. It is noted that FIG. 6 is an example schematic block diagram which is presented with the purpose of exemplification and should not be regarded as limiting. Other, or fewer, or additional components may be included in alternative implementations. In addition, it is noted that in FIG. 6, the solid connector lines between sub-circuits indicate a flow of data. In general, data from the control input sub-circuit 602 flows to other sub-circuits and data from the other sub-circuits flows to the control input sub-circuit. This is why the solid data connector lines indicate a two-way flow. The control input sub-circuits 602 acts as a central controller for the control & power circuit 600. Not only does the control input sub-circuit perform the tasks described herein, but it also performs monitoring, feedback and other conventional tasks typically performed by a central controller. As these additional tasks are conventional, they are not described in detail herein. FIG. 6 also includes dotted line connectors that indicate the flow of a powering current between the sub-circuits. In the depicted configuration, the control input sub-circuit acts as a central distributor of power to the other sub-circuits, except the recharge sub-circuit that will be described in a section to follow. Rather, the control input sub-circuit receives powering current from a recharge sub-circuit for distribution to itself and the other sub-circuits. However, in alternate implementations, powering current is distributed to the various sub-circuits of the control and power circuit by the recharge sub-circuit rather than the control input sub-circuit.

Among other tasks, the control input sub-circuit 602 generates control instructions in response to inputs from a user. The control instructions include instructions to activate the vibration units, to deactivate the vibration units, to increase the intensity of the vibrations produced by the vibration units, or to decrease the intensity of the vibrations produced by vibration units. In addition, the control instructions include instructions to control the heating and cooling element (if included) as will be described in more detail in a section to follow.

1.3.1 Control Actuators

Referring to FIG. 6, the control input sub-circuit 602 is in communication with control actuators 604. The control actuators 604 are manipulated by a user to activate and deactivate the vibration units and to increase and decrease the intensity of the vibrations produced by the vibration units. In one implementation shown in FIG. 5, the control actuators 512 are accessible from the exterior surface of the top portion 504 of the flexible sleeve. Referring again to FIG. 6, the control actuators 604 have a direct electrical connection 606 to the control input sub-circuit 602 and receive powering current from the control input sub-circuit. In another implementation shown in FIG. 7, the control actuators 712 are accessible by the user from an exterior surface of a wireless remote-control unit 714. In one implementation, the remote-control unit 714 uses a Bluetooth protocol to communicate wirelessly with the control input sub-circuit (602 of FIG. 6) of the control and power circuit 700, although it is not limited thereto. For example, an RF system protocol, or infrared light protocol, or other wireless communication protocols, could be used instead. An internal battery (not shown) powers the components within the remote-control unit, and thus no cables or powering current from the control input sub-circuit are required. Referring to FIG. 6 once again, the wireless connection between the control actuators 604 (which are part of the remote-control unit 714 of FIG. 7) and the control input sub-circuit 602 is shown as the jagged line representing a wireless signal 608.

In the remote-control implementation, the control input sub-circuit 602 includes a receiver 610 that receives wireless communications from the control actuators 604 associated with the remote-control unit. The remote-control unit has a transmitter (T) 630 that wirelessly transmits signals to the receiver (R) 610 of the control input sub-circuit 602 in response to user manipulation of the control actuators. These transmitted signals are indicative of previously described control instructions which activate and deactivate the vibration units and increase and decrease the intensity of the vibrations produced by the vibration units. It is also noted that while FIG. 6 shows both the direct connection and remote control implementations of the control actuators, alternate implementations could employ just the direct connection version of the control actuators or just the remoted control version.

Figure 7:
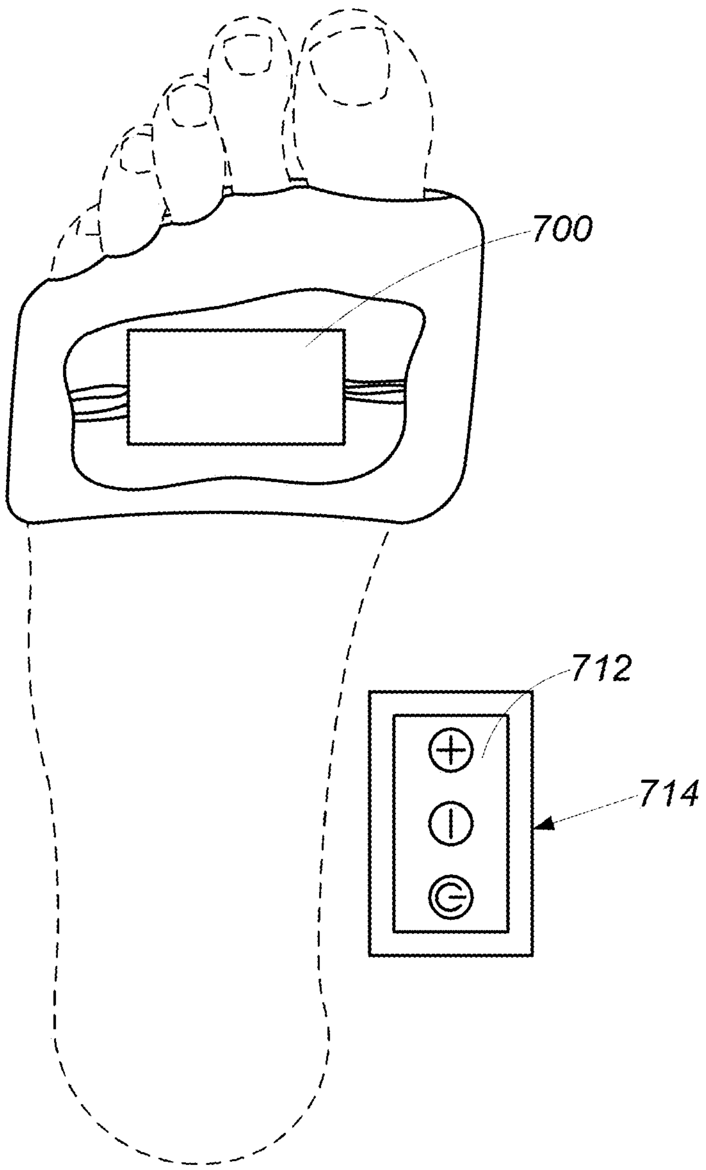
FIG. 7 is a diagram illustrating an exemplary implementation of the top portion of the flexible sleeve of the intermetatarsal space vibrator with the control and power circuit and associated wiring visible, and a separate remote-control unit that includes the control actuators.

In either the foregoing direct connection or remote-controlled implementations, one version of the control actuators includes at least three control buttons (such as in the implementations shown in FIGS. 5 and 7). In general, a control button is a circuit component that includes a user depressible component, and in its normal state has an open circuit underneath the user depressible component. When the user depressible component is pressed down by the user, a conductive surface becomes in contact with the corresponding open circuit, shorting it and generating a signal in the form of a particular voltage or current. Each different button generates its own signal, which is different and independent from the signals generated by any of the other buttons. This signal indicates to the control input sub-circuit that a particular button has been pressed down and it triggers an appropriate response as described herein. The user depressible component may have any shape, such as a circle, square, rectangle, and so on.

Figure 8A:
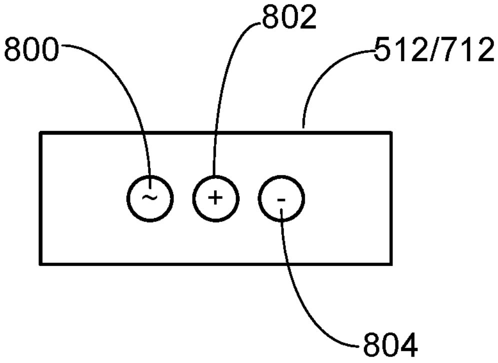
FIGS. 8A-D are diagrams illustrating various exemplary implementations of the control actuators which employ control buttons.

Referring now to FIG. 8A, a first control button 800 of the control actuators 512/712 (also see FIGS. 5 and 7) is an on-off button that when activated causes an electric signal to be generated which is received by the control input sub-circuit (either directly or via wireless transmission) and interpreted as an instruction to activate the vibration units if the vibration units are not already activated, and to deactivate the vibration units whenever the vibration units are already activated. A second button 802 is an intensity increasing button that when activated causes an electric signal to be generated which is received by the control input sub-circuit (either directly or via wireless transmission) and interpreted as an instruction to increase the intensity of the vibrations produced by the activated vibration units. This assumes the vibration units are not already set to their highest vibration intensity. If a vibration unit is already at its highest setting, the instruction to increase the intensity of the vibrations would be ignored by the control input sub-circuit. The third control button 804 is an intensity decreasing button that when activated causes an electric signal to be generated which is received by the control input sub-circuit (either directly or via wireless transmission) and interpreted as an instruction to decrease the intensity of the vibrations produced by the activated vibration units. This assumes the vibration units are not already set to their lowest vibration intensity. If a vibration unit is already at its lowest setting, the instruction to decrease the intensity of the vibrations would be ignored by the control input sub-circuit.

Figure 8B:
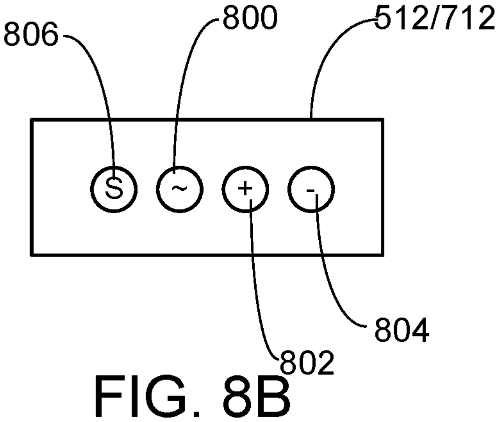

The vibration units can be controlled as a group such that all of the vibration units are activated or deactivated together, and the vibration intensity of all the activated vibration units is increased or decreased together. The foregoing implementations where the input current leads of the vibration units are electrically tied together and the output current leads of the vibration units are electrically tied together are amenable to the group control arrangement. However, in an alternate implementation, each of the vibration units are separately controlled independent of the other vibration units. The foregoing implementations where the current leads of each of the vibration units are separately connected to the control and power circuit via a pair of electrical conductors are amenable to the independent control arrangement. In the independent control arrangement, an additional control actuator is included that is used to select the vibration unit that is to be controlled. For example, referring to FIG. 8B, in the implementations that employ control buttons as actuators, an additional control button 806 is used as a selection button. Each time the selection button is depressed, an electric signal is generated which is received by the control input sub-circuit (either directly or via wireless transmission) and interpreted as an instruction to select a different one of the vibration units. The other control buttons 800/802/804 would then only control the selected vibration unit.

1.3.2 Vibration Program Sub-Circuit

Figure 8C:
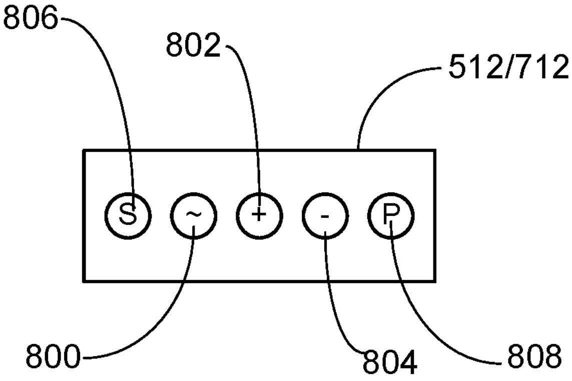

In one implementation shown in FIG. 6, the control and power circuit 600 includes a pre-established vibration program sub-circuit 612 where one or more pre-established vibration programs are stored. Each of the pre-established vibration programs includes a set of operating instructions that when executed automatically controls which of the vibration units is activated at any one time and the vibration intensity that is exhibited by each activated vibration unit over time. Pre-established vibration programs are advantageous as they free the user from having to manually change the vibrations settings during a vibration session. In addition, the pattern of vibration created by varying which vibration units are active over time, as well as the intensity of vibration exhibited by each unit, and the duration of the vibration session can be tailored to specific uses. For example, but without limitation, the vibration pattern, intensity, and duration can be tailored to maximize the therapeutic benefits to an individual suffering from inflammation in the intermetatarsal spaces on their foot. In the pre-established vibration program implementation, the control actuators include a pre-established vibration program actuator which each time it is activated causes an electric signal to be generated which is received by the control input sub-circuit (either directly or via wireless transmission) and interpreted thereby as an instruction to select a different one of the pre-established vibration programs stored in the pre-established vibration program sub-circuit. Referring to FIG. 8C, in the implementations that employ control buttons as actuators, a second additional control button 808 is used as a pre-established vibration program selection button. Referring once again to FIG. 6, in operation, once a pre-established vibration program is selected, the control input sub-circuit 602 retrieves the set of operating instruction associated with the selected program from the pre-established vibration program sub-circuit 612. The control input sub-circuit 602 then executes each instruction at a time specified by the pre-established vibration program operating instructions to control which of the vibration units are vibrating and their vibration intensity over time.

1.3.3 Vibration Unit Controller Sub-Circuit

Referring again to FIG. 6, the control and power circuit 600 further includes a vibration unit controller sub-circuit 614 that controls the vibration units based on the control instructions received from the control input sub-circuit. More particularly, for each vibration unit, when the vibration unit controller sub-circuit 614 receives a control instruction to activate a vibration unit, the vibration unit controller sub-circuit causes an electric current to flow to the vibration unit. This application of an electric current causes the vibration unit to vibrate. Additionally, for each vibration unit, when the vibration unit controller sub-circuit 614 receives a control instruction to deactivate a vibration unit, the vibration unit controller sub-circuit stops the electric current flowing to the vibration unit. This cessation of the electric current causes the vibration unit to stop vibrating. Further, for each vibration unit, when the vibration unit controller sub-circuit 614 receives a control instruction to increase the intensity of the vibrations produced by the vibration unit, the vibration unit controller sub-circuit increases the intensity of the electric current to the vibration unit to increase the intensity of the vibrations produced by the vibration unit. On the other hand, when the vibration unit controller sub-circuit 614 receives a control instruction to decrease the intensity of the vibrations produced by a vibration unit, the vibration unit controller sub-circuit decreases the intensity of the electric current to the vibration unit to decrease the intensity of the vibrations produced by the vibration unit.

1.3.4 Recharge Sub-Circuit

Referring again to FIG. 6, the control and power circuit 600 also includes a recharge sub-circuit 616. The recharge sub-circuit 616 is electrically connected to a rechargeable battery 618. The rechargeable battery 618 can be a lithium-ion polymer battery, although not limited thereto. In alternative implementations, the rechargeable battery can be other types of batteries and/or a different number of batteries. In general, the recharge sub-circuit 616 includes power circuitry that is electrically connected to the rechargeable battery and which inputs electric power from the rechargeable battery during a battery-powered operation mode to power the control and power circuit, vibration units and other electrical components of the intermetatarsal space vibrator. In addition, the recharge sub-circuit 616 provides electric power to the rechargeable battery to recharge the battery during a recharge mode. In one wired version, the recharge sub-circuit 616 includes a recharge connector (C) 620 that receives electrical power from a removable cable 622 that is plugged into the recharge connector and uses this input power to recharge the battery. In another version, the recharge sub-circuit 616 includes wireless recharge circuitry (W) 624 that wirelessly receives electrical power from an outside power source via wireless induction charging and uses this input power to recharge the battery. It is noted that in one implementation shown in FIG. 6, the control and power circuit includes circuitry for both wired and wireless recharging. Still further, one implementation of the control and power circuit 600 includes circuitry that enables the previously described wired version to bypass using the battery for power and instead directly power the control and power circuit, vibration units and other electrical components of the intermetatarsal space vibrator when the removable cable is plugged into the recharge connector. However, even in the foregoing direct power mode, the battery can still be recharged at the same time.

1.3.5 Heating and Cooling Element Controller Sub-Circuit

As indicated previously, the control and power circuit controls the heating and cooling element. More particularly, referring again to FIG. 6, the control input sub-circuit 602 generates control instructions in response to inputs from a user via the set of control actuators 604 and provides the instruction to a heating and cooling element controller sub-circuit 626. In this case, the control instructions include instructions to select whether the heating and cooling element heats or cools the individual's foot, to activate the heating and cooling element, to deactivate the heating and cooling element, to increase the temperature, or to decrease the temperature. The control actuators 604 of the control and power circuit are directly connected via the electrical conductor 606 and/or wirelessly connected via signal 608 to the control input sub-circuit 602 and are manipulated by a user to select whether the heating and cooling element heats or cools the bottom portion of the flexible sleeve, to activate and deactivate the heating and cooling element, and to increase and decrease the temperature.

Figure 8D:
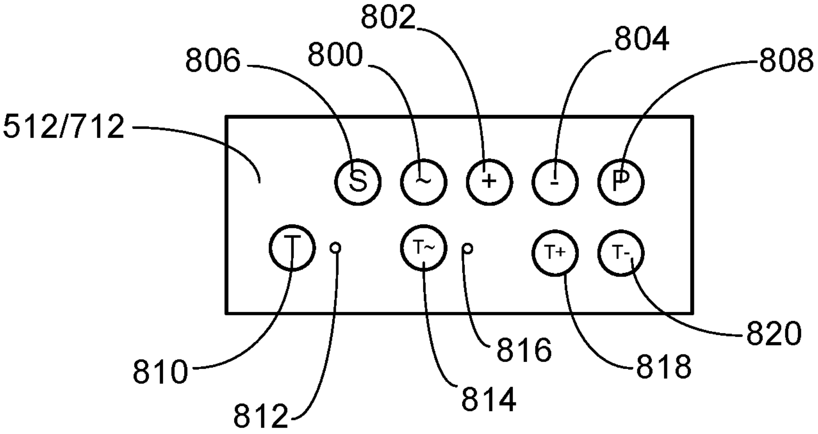

In either the previously described direct connection or remote-controlled implementations, one version of the control actuators includes additional buttons to control the heating and cooling element. These additional control buttons are shown in FIG. 8D. It is noted that the depicted control button configuration of FIG. 8D modifies the control button configuration of FIG. 8C. However, any of the other control button configurations described previously can be modified instead. Each of these additional control buttons when depressed causes a signal to be sent to the control input sub-circuit. More particularly, a heating or cooling selection control button 810 is used to select whether the heating and cooling element will operate in a heating mode or in a cooling mode. Each time the heating or cooling selection button 810 is depressed, an electric signal is generated which is received by the control input sub-circuit (either directly or via wireless transmission) and interpreted as an instruction to select either the heating mode if the cooling mode is currently selected or the cooling mode if the heating mode is currently selected. In one version, an indicator light 812 (such as a light emitting diode) which is visible to a user is included and located adjacent heating or cooling selection button on the exterior surface of the top portion of the flexible sleeve if that is where the control buttons are located or on the exterior surface of the remote-control unit if that is where the control buttons are located (or both). In a simple implementation of the heating or cooling indicator light, the light is on if the heating mode is currently selected and off if the cooling mode is selected. However, other indicator light configurations are also envisioned such as a light that shines one color (e.g., red) when the heating mode is selected and another color (e.g., blue) when the cooling mode is selected. Furthermore, in one version, there are two labelled indicator lights adjacent to the heating or cooling selection button, with one of the lights being labeled “heat” and the other “cool”. The indicator light labeled “heat” is on when the heating mode is selected and off when the cooling mode is selected. The indicator light labeled “cool” is on when the cooling mode is selected and off when the heating mode is selected. A heating and cooling element on-off button 814 is also included that when activated causes an electric signal to be generated which is received by the control input sub-circuit (either directly or via wireless transmission) and interpreted as an instruction to activate the selected mode if it is not already activated or to deactivate the selected mode if it is already activated. In one version, an on-off indicator light 816 visible to a user is included and located adjacent heating and cooling on-off button on the exterior surface of the top portion of the flexible sleeve if that is where the control buttons are located or on the exterior surface of the remote-control unit if that is where the control buttons are located (or both). The on-off indicator light 816 is illuminated when the heating and cooling element is activated and off when the heating and cooling element is deactivated. In one version, a temperature increasing button 818 is also included that when activated causes an electric signal to be generated which is received by the control input sub-circuit (either directly or via wireless transmission) and interpreted as an instruction to increase the temperature produced by the heating and cooling element. This assumes the heating and cooling element is not already set to its highest temperature setting for the selected heating or cooling mode. If the heating and cooling element is already at its highest setting, the instruction to increase the temperature would be ignored by the control input sub-circuit. Additionally, a temperature decreasing button 820 is included that when activated causes an electric signal to be generated which is received by the control input sub-circuit (either directly or via wireless transmission) and interpreted as an instruction to decrease the temperature produced by the heating and cooling element. This assumes the heating and cooling element is not already set to its lowest temperature setting for the selected heating or cooling mode. If the heating and cooling element is already at its lowest setting, the instruction to decrease the temperature would be ignored by the control input sub-circuit.

Referring again to FIG. 6, as indicated previously, in one implementation the control and power circuit further includes a heating and cooling element controller sub-circuit 626 that controls the heating and cooling element units based on the control instructions received from the control input sub-circuit 602. More particularly, when the heating and cooling controller sub-circuit 626 receives a control instruction that indicates whether the heating mode or the cooling mode is selected and to activate a heating and cooling element, the heating and cooling controller sub-circuit causes an electric current to flow to the heating and cooling element. The direction of the current flow initiated by the heating and cooling controller sub-circuit 626 depends on the mode selection. The initial temperature setting for the selected mode is a prescribed default temperature but can be increased or decreased as indicated previously. More particularly, when the heating and cooling controller sub-circuit 626 receives a control instruction to increase the temperature, it increases the intensity of the electric current flowing to the heating and cooling element, and when the heating and cooling controller sub-circuit receives a control instruction to decrease the temperature, it decreases the intensity of the electric current flowing to the heating and cooling element.

1.3.6 Timer Sub-Circuit

Referring to FIG. 6, in one implementation, the control and power circuit 600 also includes a timer sub-circuit 628. The timer sub-circuit 628 is responsible for monitoring when each vibration unit is activated, as well as when the heating and cooling element is activated in implementations that include one. The timer sub-circuit 628 is also responsible for automatically deactivating a vibration unit or the heating and cooling element after it has been active for a period of time. To this end, in one version, the timer sub-circuit 628 is electrically connected to the control input sub-circuit 602 and can communicate with the vibration unit control sub-circuit 614 via the control input sub-circuit 602 to monitor activation of each vibration unit and to deactivate the units. In addition, the timer sub-circuit 628 can communicate with the heating and cooling element controller sub-circuit 626 via the control input sub-circuit 602 to monitor activation of the heating and cooling element and to deactivate the element.

In one version, the aforementioned period of time is a prescribed default period, in another version it is a period of time set by a user. In the version where the user sets the period of time that each vibration unit or the heating and cooling element is active, the user inputs the desired time period using any appropriate timer interface that has been incorporated into the control actuators. The specified time period and the unit or element that it applied to is provided to the timing sub-circuit. When a vibration unit or the heating and cooling element has been active for the time period input by the user, the timer sub-circuit sends a deactivate instruction to the vibration unit controller sub-circuit or the heating and cooling element controller sub-circuit, as appropriate.

2.0 Other Advantages and Implementations

While the intermetatarsal space vibrator has been described in more detail by specific reference to implementations thereof, it is understood that variations and modifications thereof can be made without departing from the true spirit and scope of the sensor. For example, the control actuators described previously can also include various light emitting diodes of different colors that display information to the user, such as battery charge state, wireless pairing state, charging state, or other information.

It is noted that the layout of the control buttons shown in FIGS. 8A-D, and any symbols printed on the buttons, are exemplary in nature and not intended as representing the only possible layout and symbols. Rather, other layouts and symbols can be used instead as desired. Furthermore, while the use of buttons was described as one way of implementing the control actuator, other user-input devices can be used instead. For example, instead of the previously described selection button that is pushed repeatedly to select different vibration units, or to select whether the heating and cooling element is in heating mode or cooling mode, a selector switch could be used instead. A user would rotate or slide the selector switch to the position corresponding to the desired setting. Labels could also be added to indicate the various selection settings. Another example involves the buttons used to increase or decrease the vibration intensity exhibited by the vibration unit(s) or the temperature setting associated with the heating and cooling element. Instead of using a pair of buttons to accomplish the task, a single slider device would be employed. The slider would slide in one direction to increase the vibration intensity or temperature and slide the opposite direction to decrease the vibration intensity or temperature. Another version of the control actuator would employ a touch screen that displays icons representing the previously described control buttons, or selector switch, or slider, which a user can manipulate using the touch screen.

It is further noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned intermetatarsal space vibrator implementations have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components. Any components described herein may also interact with one or more other components not specifically described herein but generally known by those of skill in the art.

3.0 Exemplary Operating Environments

Figure 9:
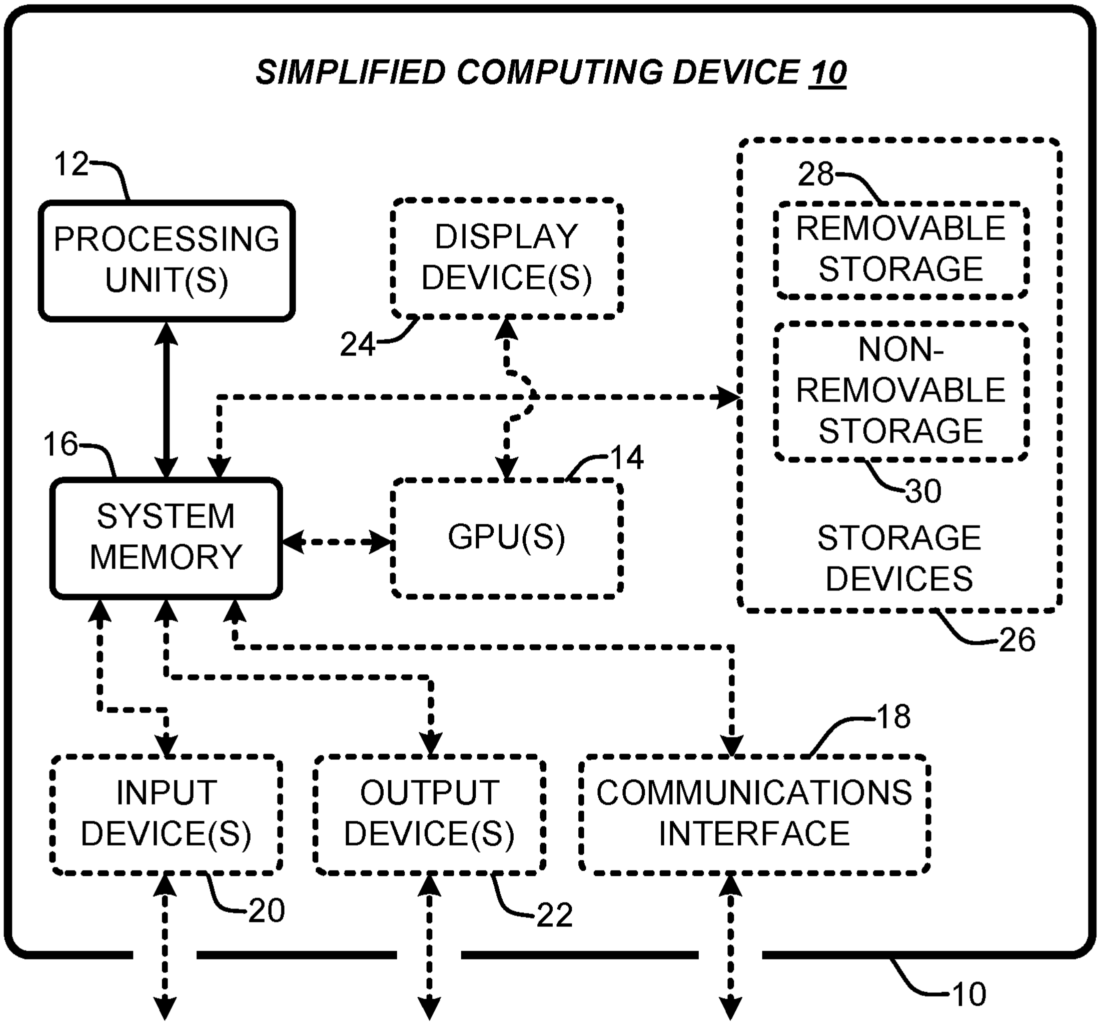
FIG. 9 is a diagram illustrating a simplified example of a computing device on which various aspects of the intermetatarsal space vibrator, as described herein, may be realized.

The previously described electronic processor and memory components of the intermetatarsal space vibrator implementations can employ numerous types of general purpose or special purpose computing system environments or configurations. FIG. 9 illustrates a simplified example of a general-purpose computer system on which various implementations and elements of the intermetatarsal space vibrator, as described herein, may be implemented. It is noted that any boxes that are represented by broken or dashed lines in the simplified computing device 10 shown in FIG. 9 represent alternate implementations of the simplified computing device. As described below, any or all of these alternate implementations may be used in combination with other alternate implementations that are described throughout this document. The simplified computing device 10 is typically found in devices having at least some minimum computational capability such as microprocessor-based systems, programmable consumer electronics, and minicomputers.

The computing device should have sufficient computational capability and system memory to enable basic computational operations. In particular, the computational capability of the simplified computing device 10 shown in FIG. 9 is generally illustrated by one or more processing unit(s) 12, and may also in some implementations include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature described herein, including input, output, control, feedback, and response to one or more users or other devices or systems associated with the hand-held controller implementations, are enabled by a variety of Natural User Interface (NUI) scenarios. The NUI techniques and scenarios enabled by the hand-held controller implementations include, but are not limited to, interface technologies that allow one or more users to interact with the hand-held controller implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects, or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the intermetatarsal space vibrator implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the intermetatarsal space vibrator implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 9 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various intermetatarsal space vibrator implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Some aspects of the intermetatarsal space vibrator implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. Some aspects of the intermetatarsal space vibrator implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor. Still further, aspects of the controller implementations described herein can be virtualized and realized as a virtual machine running on a computing device such as any of those described previously.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Wherefore, what is claimed is:

1. An intermetatarsal space vibrator for vibrating regions of the bottom of an individual's forefoot underlying intermetatarsal spaces of the forefoot, comprising:

a flexible sleeve that is configured to fit over the end of an individual's foot, said flexible sleeve comprising a bottom portion having an interior facing side that is configured to contact a transverse arch area of the bottom of the individual's forefoot, and a top portion that is configured to contact the top of the individual's foot behind the toes and opposite the bottom portion of the sleeve, said flexible sleeve further comprising a front portion having a separate opening for each of the individual's toes that allows the individual's toes to extend out of and forward of the sleeve, and an open back portion beyond which the part of the individual's foot behind the forefoot extends out of the flexible sleeve in use, such that the flexible sleeve does not extend underneath the individual's heel and the distal-most part of the individual's toes in use;

at least one vibration unit, each vibration unit of the at least one vibration unit being embedded in the bottom portion of the flexible sleeve in a location that is under a different one of the intermetatarsal spaces of the individual's forefoot whenever the flexible sleeve is installed onto the individual's foot, and each vibration unit of the at least one vibration unit producing vibrations that are designed to stimulate the intermetatarsal nerve and other tissues disposed within the associated intermetatarsal space; and a control and power circuit embedded in the top portion of the flexible sleeve, said control and power circuit being electrically connected to each vibration unit of the at least one vibration unit, said control and power circuit being employed to activate and deactivate each vibration unit of the at least one vibration unit and to increase and decrease an intensity of the vibrations produced by each vibration unit of the at least one vibration unit.

2. The intermetatarsal space vibrator of claim 1, wherein each vibration unit of the at least one vibration unit comprises an encapsulated, electric vibration motor that is electrically connected to the control and power circuit, each said electric vibrating motor vibrating when electric current is applied.

3. The intermetatarsal space vibrator of claim 1, wherein the control and power circuit comprises a control input sub-circuit that generates control instructions in response to inputs from a user, said control instructions comprising instructions to activate each vibration unit of the at least one vibration unit, to deactivate each vibration unit of the at least one vibration unit, to increase the intensity of the vibrations produced by each vibration unit of the at least one vibration unit, or to decrease the intensity of the vibrations produced by each vibration unit of the at least one vibration unit.

4. The intermetatarsal space vibrator of claim 3, further comprising control actuators accessible from an exterior surface of the top portion of the flexible sleeve, said control actuators electrically connected to the control input sub-circuit and are manipulatable by the user to activate and deactivate each vibration unit of the at least one vibration unit and to increase and decrease the intensity of the vibrations produced by each vibration unit of the at least one vibration unit.

5. The intermetatarsal space vibrator of claim 4, wherein the control actuators comprise at least three control buttons, wherein each of said at least three control buttons when depressed causes an electric signal to be sent to the control input sub-circuit, wherein a first control button of the at least three control buttons is an on-off button that when activated causes a first electric signal to be generated, said first electric signal being received by the control input sub-circuit and interpreted thereby as an instruction to activate each vibration unit of the at least one vibration unit whenever not already activated and to deactivate each vibration unit of the at least one vibration unit whenever activated, and wherein a second control button of the at least three control buttons is an intensity increasing button that when activated causes a second electric signal to be generated, said second electric signal being received by the control input sub-circuit and interpreted thereby as an instruction to increase the intensity of the vibrations produced by each activated vibration unit of the at least one vibration unit, and wherein a third control button of the at least three control buttons is an intensity decreasing button that when activated causes a third electric signal to be generated, said third electric signal being received by the control input sub-circuit and interpreted thereby as an instruction to decrease the intensity of the vibrations produced by each activated vibration unit of the at least one vibration unit.

6. The intermetatarsal space vibrator of claim 3, wherein the control input sub-circuit further comprises a receiver that receives wireless communications from a remote-control unit, said remote control unit comprising, control actuators that are accessible by the user from an exterior surface of the remote-control unit, and a transmitter that wirelessly transmits signals to the receiver of the control input sub-circuit in response to user manipulation of the control actuators, said transmitted signals being indicative of control instructions that activate and deactivate each vibration unit of the at least one vibration unit and increase and decrease the intensity of the vibrations produced by each vibration unit of the at least one vibration unit.

7. The intermetatarsal space vibrator of claim 6, wherein the remote-control unit control actuators comprise at least three control buttons, wherein each of said at least three control buttons when depressed causes an electric signal to be wirelessly transmitted to the control input sub-circuit receiver, wherein a first control button of the at least three control buttons is an on-off button that when activated causes a first electric signal to be generated, said first electric signal being received by the control input sub-circuit and interpreted thereby as an instruction to activate each vibration unit of the at least one vibration unit whenever not already activated and to deactivate each vibration unit of the at least one vibration unit whenever activated, and wherein a second control button of the at least three control buttons is an intensity increasing button that when activated causes a second electric signal to be generated, said second electric signal being received by the control input sub-circuit and interpreted thereby as an instruction to increase the intensity of the vibrations produced by each activated vibration unit of the at least one vibration unit, and wherein a third control button of the at least three control buttons is an intensity decreasing button that when activated causes a third electric signal to be generated, said third electric signal being received by the control input sub-circuit and interpreted thereby as an instruction to decrease the intensity of the vibrations produced by each activated vibration unit of the at least one vibration unit.

8. The intermetatarsal space vibrator of claim 3, wherein the control and power circuit further comprises a vibration unit controller sub-circuit that controls each vibration unit of the at least one vibration unit based on the control instructions received from the control input sub-circuit.

9. The intermetatarsal space vibrator of claim 8, wherein one or more of the at least one vibration unit is selected, and wherein the vibration unit controller sub-circuit causes an electric current to flow to each selected vibration unit whenever the vibration unit controller sub-circuit receives a control instruction to activate each selected vibration unit, wherein said electric current causes each selected vibration unit to vibrate; and wherein whenever a vibration unit of the at least one vibration unit is activated and vibrating, and the vibration unit controller sub-circuit receives a control instruction to deactivate said activated and vibrating vibration unit, the vibration unit controller sub-circuit stops the flow of electric current to said activated and vibrating vibration unit; and wherein whenever a vibration unit of the at least one vibration unit is activated and vibrating, and the vibration unit controller sub-circuit receives a control instruction to increase the intensity of the vibrations produced by said activated and vibrating vibration unit, the vibration unit controller sub-circuit increases the intensity of the electric current to said activated and vibrating vibration unit to increase the intensity of the vibrations produced by said activated and vibrating vibration unit; and wherein whenever a vibration unit of the at least one vibration unit is activated and vibrating, and the vibration unit controller sub-circuit receives a control instruction to decrease the intensity of the vibrations produced by said activated and vibrating vibration unit, the vibration unit controller sub-circuit decreases the intensity of the electric current to said activated and vibrating vibration unit to decrease the intensity of the vibrations produced by said activated and vibrating vibration unit.

10. The intermetatarsal space vibrator of claim 1, wherein the control and power circuit further comprises a recharge sub-circuit and a rechargeable battery, wherein the recharge sub-circuit comprises power circuitry that is electrically connected to the rechargeable battery, said power circuitry inputting electric power from the rechargeable battery during a battery-powered operation mode to power the control and power circuit and provides electric power to the rechargeable battery to recharge the battery during a recharge mode.

11. The intermetatarsal space vibrator of claim 10, wherein the recharge sub-circuit further comprises a recharge connector that receives electrical power from an electric cable that is removably connected to the recharge connector, wherein the received electrical power is used to recharge the battery during the recharge mode.

12. The intermetatarsal space vibrator of claim 10, wherein the recharge sub-circuit further comprises a wireless recharge sub-circuit that wirelessly receives electrical power from an outside power source, wherein the received electrical power is used to recharge the battery during the recharge mode.

13. An intermetatarsal space vibrator for vibrating regions of the bottom of an individual's forefoot underlying intermetatarsal spaces of the forefoot, comprising:

a flexible sleeve that is configured to fit over the end of an individual's foot, said flexible sleeve comprising a bottom portion having an interior facing side that is configured to contact a transverse arch area of the bottom of the individual's forefoot, and a top portion that is configured to contact the top of the individual's foot behind the toes and opposite the bottom portion of the sleeve, said flexible sleeve further comprising a front portion having an open front portion that allows the individual's toes to extend out of and forward of the sleeve, and an open back portion beyond which the part of the individual's foot behind the forefoot extends out of the flexible sleeve in use, such that the flexible sleeve does not extend underneath the individual's heel and the distalmost part of the individual's toes in use;

at least one vibration unit, each vibration unit of the at least one vibration unit being embedded in the bottom portion of the flexible sleeve in a location that is under a different one of the intermetatarsal spaces of the individual's forefoot whenever the flexible sleeve is installed onto the individual's foot, and each vibration unit of the at least one vibration unit producing vibrations that are designed to stimulate the intermetatarsal nerve and other tissues disposed within the associated intermetatarsal space; and a control and power circuit embedded in the top portion of the flexible sleeve, said control and power circuit being electrically connected to each vibration unit of the at least one vibration unit, and said control and power circuit being employed to activate and deactivate each vibration unit of the at least one vibration unit separately and to separately increase and decrease an intensity of the vibrations produced by each vibration unit of the at least one vibration unit.

14. The intermetatarsal space vibrator of claim 13, wherein the control and power circuit comprises a control input sub-circuit that generates control instructions in response to inputs from a user, said control instructions comprising instructions to separately activate each vibration unit of the at least one vibration unit, to separately deactivate each vibration unit of the at least one vibration unit, to separately increase the intensity of the vibrations produced by each vibration unit of the at least one vibration unit, or to separately decrease the intensity of the vibrations produced by each vibration unit of the at least one vibration unit.

15. The intermetatarsal space vibrator of claim 14, further comprising control actuators that are accessible by the user and in electrical communication with the control input sub-circuit, said control actuators being manipulatable by the user to separately activate and deactivate each vibration unit of the at least one vibration unit and to separately increase and decrease the intensity of the vibrations produced by each vibration unit of the at least one vibration unit.

16. The intermetatarsal space vibrator of claim 15, wherein the control actuators comprise a plurality of control buttons, wherein each of said plurality of control buttons when depressed causes an electric signal to be received by the control input sub-circuit, wherein a first control button of the plurality of control buttons is a selection button that each time it is depressed causes a first electric signal to be generated, said first electric signal being received by the control input sub-circuit and interpreted thereby as an instruction to select a different vibration unit of the at least one vibration unit, a second button of the plurality of control buttons is an on-off button that when activated causes a second electric signal to be generated, said second electric signal being received by the control input sub-circuit and interpreted thereby as an instruction to activate the vibration unit of the at least one vibration unit that is currently selected whenever the currently selected vibration unit is not already activated and to deactivate the vibration unit of the at least one vibration unit that is currently selected whenever the currently selected vibration unit is activated, and wherein a third control button of the plurality of control buttons is an intensity increasing button that when activated causes a third electric signal to be generated, said third electric signal being received by the control input sub-circuit and interpreted thereby as an instruction to increase the intensity of the vibrations produced by the vibration unit of the at least one vibration unit that is currently selected whenever the currently selected vibration unit is activated, and wherein a fourth control button of the plurality of control buttons is an intensity decreasing button that when activated causes a fourth electric signal to be generated, said fourth electric signal being received by the control input sub-circuit and interpreted thereby as an instruction to decrease the intensity of the vibrations produced by the vibration unit of the at least one vibration unit that is currently selected whenever the currently selected vibration unit is activated.

17. The intermetatarsal space vibrator of claim 15, wherein the control actuators are accessible from an exterior surface of the top portion of the flexible sleeve.

18. The intermetatarsal space vibrator of claim 15, wherein the control input sub-circuit further comprises a receiver that receives wireless communications from a remote-control unit, said remote control unit comprising, control actuators that are accessible by the user from an exterior surface of the remote-control unit, and a transmitter that wirelessly transmits signals to the receiver of the control input sub-circuit in response to user manipulation of the control actuators, said transmitted signals comprising first transmitted signals indicative of control instructions that separately activate and deactivate each vibration unit of the at least one vibration unit, and said transmitted signals comprising second transmitted signals that separately increase and decrease the intensity of the vibrations produced by each vibration unit of the at least one vibration unit.

19. The intermetatarsal space vibrator of claim 15, wherein the control actuators comprise an actuator that each time it is activated causes an electric signal to be generated that is received by the control input sub-circuit and interpreted thereby as an instruction to select a different one of at least one pre-established vibration programs, each pre-established vibration program automatically controlling whether a selected vibration unit of the at least one vibration unit is activated at any one time and the vibration intensity that is exhibited by the selected vibration unit of the at least one vibration unit over time whenever the selected vibration unit of the at least one vibration unit is activated.

20. An intermetatarsal space vibrator for vibrating regions of the bottom of an individual's forefoot underlying intermetatarsal spaces behind the individual's toes, comprising:

a flexible sleeve that is configured to fit over the end of an individual's foot, said flexible sleeve comprising a bottom portion having an interior facing side that is configured to contact a transverse arch area of the bottom of the individual's forefoot, and a top portion that is configured to contact the top of the individual's foot behind the toes and opposite the bottom portion of the sleeve, said flexible sleeve further comprising a front portion having a separate opening for each of the individual's toes that allows the individual's toes to extend out of and forward of the sleeve, and an open back portion beyond which the part of the individual's foot behind the forefoot extends out of the flexible sleeve in use, such that the flexible sleeve does not extend underneath the individual's heel and the distal-most part of the individual's toes in use;

at least one vibration unit, each vibration unit of the at least one vibration unit being embedded in the bottom portion of the flexible sleeve in a location that is under a different one of the intermetatarsal spaces of the individual's forefoot whenever the flexible sleeve is installed onto the individual's foot, and each vibration unit of the at least one vibration unit producing vibrations that are designed to stimulate the intermetatarsal nerve and other tissues disposed within the associated intermetatarsal space;

a heating and cooling element disposed between an exterior-facing surface of a bottom of the flexible sleeve and each embedded vibration unit of the at least one vibration unit that when activated either heats or cools the entire transverse arch area of the individual's foot; and a control and power circuit embedded in the top portion of the flexible sleeve, said control and power circuit being electrically connected to each vibration unit of the at least one vibration unit and to the heating and cooling element, and said control and power circuit being employed to activate and deactivate each vibration unit of the at least one vibration unit and to increase and decrease an intensity of the vibrations produced by each vibration unit of the at least one vibration unit, and to activate and deactivate the heating and cooling element and select whether the heating and cooling element heats or cools the individual's foot, and to increase or decrease the temperature provided by the heating and cooling element.

21. The intermetatarsal space vibrator of claim 20, wherein the control and power circuit further comprises a control input sub-circuit that generates control instructions in response to inputs from a user via a set of control actuators, said control instructions comprising instructions to activate each vibration unit of the at least one vibration unit, to deactivate each vibration unit of the at least one vibration unit, to increase the intensity of the vibrations produced by each vibration unit of the at least one vibration unit, to decrease the intensity of the vibrations produced by each vibration unit of the at least one vibration unit, to select whether the heating and cooling element heats or cools the individual's foot, to activate the heating and cooling element, or to deactivate the heating and cooling element and to increase or decrease the temperature provided by the heating and cooling element.

* * * * *